United States Patent [19]

Jenkins

[11] 4,046,744

[45] Sept. 6, 1977

[54] THERMOSETTING COATINGS BASED ON KETOXIME-BLOCKED ISOCYANATES AND OXAZOLIDINES

[75] Inventor: Raymond F. Jenkins, Masonville, N.J.

[73] Assignee: Rohm and Haas Company, Philadelphia, Pa.

[21] Appl. No.: 709,570

[22] Filed: July 28, 1976

[51] Int. Cl.² .............................................. C08G 18/06
[52] U.S. Cl. ..................... 260/77.5 AQ; 260/75 NQ; 260/77.5 R; 260/77.5 TB; 428/423; 428/425; 428/457; 428/473; 428/537
[58] Field of Search ............... 260/77.5 TB, 77.5 AQ, 260/77.5 NQ, 77.5 R; 428/423, 425, 457, 473, 537

[56] References Cited

U.S. PATENT DOCUMENTS

| | | | |
|---|---|---|---|
| 3,694,389 | 9/1972 | Levy | 260/77.5 CR |
| 3,743,626 | 7/1973 | Emmons | 260/77.5 AQ |
| 3,857,818 | 12/1974 | Frizelle | 260/859 R |
| 3,912,691 | 10/1975 | Emmons | 260/77.5 AQ |

*Primary Examiner*—Eugene C. Rzucidlo

[57] ABSTRACT

Low temperature, one-component thermosetting coating compositions comprising a ketoxime-blocked polyisocyanate and an oxazolidine are disclosed. Also disclosed are a process for curing such composition and the cured products.

18 Claims, No Drawings

THERMOSETTING COATINGS BASED ON KETOXIME-BLOCKED ISOCYANATES AND OXAZOLIDINES

BACKGROUND OF THE INVENTION

1. Field of the Invention

This invention relates to one-pot thermosetting coating compositions.

2. Description of the Prior Art

Two-pot polyurethane coating compositions which comprise a polyfunctional isocyanate and an active hydrogen compound are well known. Also known are polyurethane coating compositions which are prepared from "one-pot" formulations, for example, that described by Levy in U.S. Pat. No. 3,694,389 wherein a ketoxime-blocked polyisocyanate is used instead of the usual unblocked polyisocyanate. The use of oxazolidine as a substitute for amine or alcohol active hydrogen compounds is also known, for example see Emmons U.S. Pat. No. 3,743,626. The advantage of one-pot systems is extended pot life, but a disadvantage of prior one-pot systems is that they require high curing temperatures which, in many applications, damages the substrate which is to be coated. The advantage of two component systems versus the above-described one component systems is low temperature cure. However, the industry still desires a one-pot polyurethane coating system with extended pot life as well as low temperature cure. To date such compositions have not been available, in spite of the industrial demand for them.

It is an object of the present invention to provide such one component, low temperature cure thermosetting polyurethane coating compositions. A further object is to provide a process for using such compositions. A still further object is to provide a cured coating composition prepared at low temperature from a one pot system, particularly for substrates sensitive to high temperatures, such as plastics, wood, paper and leather, although other substrates such as metal may also be used.

SUMMARY OF THE INVENTION

These objects, and others as will become apparent from the following disclosure, are achieved by the present invention which comprises compositions comprising a ketoximeblocked isocyanate and an oxazolidine.

Another aspect of the present invention is a low temperature process for preparing thermoset polyurethane coatings from such one pot compositions.

A still further aspect of the invention is the resultant cured coatings which have certain advantageous properties.

A. THE OXAZOLIDINE COMPONENT

A wide variety of oxazolidines can be used in the compositions of the invention, and any monofunctional or polyfunctional oxazolidine will generally be suitable. Generally, the oxazolidines used in the compositions of the invention will have no active hydrogen atoms. By active hydrogen atoms are meant the hydrogen atoms of groups, such as primary and secondary amino, carboxyl, and hydroxyl groups, which readily undergo reaction with electrophilic reagents, such as isocyanates. Oxazolidines which have active hydrogen atoms and compositions comprising other materials which have active hydrogen atoms are less preferred, but can also be advantageously employed to give compositions which have adequate stability or improved curing speed over prior art materials as well as which will provide useful solid polymeric materials. The term "oxazolidine" is used to include both the five-membered ring oxazolidines and the six-membered ring tetrahydro oxazines, and to include compounds having one or more oxazolidine rings. Compounds having more than one oxazolidine ring are generally referred to herein as polyfunctional oxazolidines.

The oxazolidine substitutents of the compounds useful in the compositions of the invention generally can be represented by the following formula:

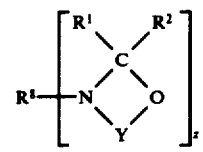

(I)

wherein $R_1$ is a hydrogen atom, a phenyl group, a benzyl group, or a ($C_1 - C_{12}$) alkyl group, and $R^2$ is a hydrogen atom or a ($C_1 - C_4$) alkyl group, or $R^1$ and $R^2$ can be taken together with the attached carbon atom to form a saturated five- or six-membered saturated carbon ring, and Y is the radical

wherein n is 2 or 3, and $R^3$ and $R^4$ are, individually, hydrogen atoms, ($C_1 - C_{12}$) alkyl groups, ($C_6 - C_{10}$) aryl groups, or ($C_7 - C_{12}$) aralkyl or alkaryl groups, $R^5$ is a saturated or unsaturated alkyl or polyvalent alkylene radical having up to 38 carbon atoms, and aralkyl, alkaryl, polyvalent aralkylene, or polyvalent alkarylene radical having up to 25 carbon atoms, or an aryl or polyvalent arylene radical having up to 18 carbon atoms, and z is an integer equal to the valence of $R^5$.

The groups represented by $R^1$, $R^2$, $R^3$, and $R^4$ can also have inert substituents, such as halogen atoms, alkoxy groups, nitro groups, and the like, and in some embodiments can also have active substitutents, such as hydroxyl groups or amino groups.

Five types of oxazlidines are among the preferred oxazolidines for the compositions of the invention: polyfunctional polyol ester oxazolidines, polyfunctional polycarboxylic ester oxazolidines, monofunctinal ester oxazolidines, polymers and copolymers of oxazolidinylalkyl acrylates and methacrylates, as well as the simple aliphatic and aromatic mono- and bis-oxazolidines.

A preferred class of polyfunctional polyol ester oxazolidines has the general formula

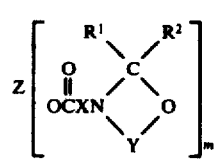

(II)

wherein $R^1$, $R^2$, and Y are as defined above, m is an integer of two to four and is equal to the valence of Z. Z is a divalent alkylene radical or a tri- or tetravalent hydrocarbon radical, a monovalent $(C_1 - C_{18})$ alkyl group, a $(C_3 - C_{18})$ alkyl group, a $(C_3 - C_{12})$ cycloalkyl group, a $(C_6 - C_{12})$ aryl group, or a $(C_7 - C_{15})$ aralkyl or alkaryl group, X is the radical

wherein
q is an integer of 2 to 4, and
$R^5$ and $R^6$ are individually selected from hydrogen and unsubstituted or substituted $(C_1 - C_6)$ alkyl groups.

Compounds of Formula II can be produced by reacting an oxazolidine having ester functionality, prepared as described below, with a saturated or ethylenically unsaturated polyol which can contain aryl groups such as phenylene, etc., to effect the transesterification of the oxazolidine. The starting monofunctional oxazolidine used in the transesterification reaction can be produced in a Michael addition wherein an oxazolidine having a hydrogen atom on the ring nitrogen atom is reacted with an ester of an α,β-ethylenically unsaturated carboxylic acid to form as the Michael addition product an oxazolidinyl alkanoate ester. Preferably an ester of acrylic or methacrylic acid will be used in the Michael addition, thus forming the propionate or isobutyrate ester. Alternatively a primary alkanolamine is reacted with an ester of α,β-ethylenically unsaturated carboxylic acid to form a Michael addition product. The Michael addition product is then further reacted with an appropriate carbonyl compound, such as an aldehyde or ketone, to produce a monofunctional oxazolidine having ester functionality. For example, when an acrylate ester is used as the starting material in the Michael addition reaction, the Michael addition product is α,β-substituted propionate ester.

The novel intermediate oxazolidine formed by reacting the Michael addition product with the appropriate carbonyl compound has the general formula

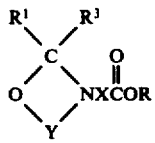

(III)

where R is a $(C_1 - C_{18})$ alkyl group, a $(C_3 - C_{12})$ cycloalkyl group, a $(C_6 - C_{12})$ aryl group, or a $(C_7 - C_{15})$ aralkyl or alkaryl group, and $R^1$, $R^2$, X and Y are as defined above. The monofunctional oxazolidines of Formula III also constitute one of the preferred classes of oxazolidines useful in the compositions of the invention.

The starting oxazolidine used in the transesterification reaction can also be prepared by allowing (1) an oxazolidine, (2) a compound capable of reacting as an oxazolidine, or (3) a compound capable of being converted under the reaction conditions to an oxazolidine to react with the appropriate ester of an unsaturated carboxylic acid, such as an ester of acrylic acid. For example, formaldehyde and ethanolamine react to form a product which may not be an oxazolidine but which is tautomeric with the oxazolidine, or a polymer thereof. This product reacts with esters of acrylic acid to form oxazolidinylpropionate esters. Isobutyraldehyde and ethanolamine react to form an equilibrium mixture of the oxazolidine and the hydroxyethylimine which on reaction with esters of acrylic acid also form oxazolidinylpropionate esters. As an alternative to providing compounds of Formula II by transesterification of simple oxazolidine esters with polyols, esters of acrylic acid with polyols can be reacted either with oxazolidines, or compounds capable of being converted to oxazolidines under the reaction conditions as indicated above for the simple esters. When the polyol employed in the transesterification is a phenolic compound, acid chlorides may advantageously be used to prepare the esters.

The transesterification reaction can, if desired, be catalyzed. Suitable catalysts include sodium salts of phenols, such as sodium phenoxide, p-hydroxyphenylamine, or a tetraalkyl titanate, such as tetraisopropyl or tetrabutyl titanate. If the reaction is carried out using a tetraalkyl titanate as the catalyst, about one-half percent to about ten percent, preferably one to five percent, by weight of the titanate based on the weight of the oxazolidine is used. No solvent is needed. The starting materials can be used in stoichiometrically equivalent amounts or the ester can be used in an excess amount. The alcohol liberated during the transesterification can be removed by fractional or azeotropic distillation. The reaction is generally carried out at temperatures of about 50° to about 180° C. and the completion of the reaction can be determined by measuring the amount of alcohol removed. The theoretical amount of alcohol that should be liberated out of the system by distillation is readily calculated.

Basic metal hydroxides can also be used as the transesterification catalysts. They can be used in an amount of from about 0.2% to about 5% and preferably from about 1 to about 3% by weight based on the weight of the starting oxazolidine. Sodium methoxide or sodium ethoxide as well as the potassium and lithium analogs can be used. An illustrative transesterification reaction would involve mixing of a starting oxazolidine and a polyol with a solution of the alkoxide in an alcohol such as methanol. The alkoxide solution can be added gradually to the polyol-oxazolidine mixture. No additional solvent is needed. The temperature may be from 50° to about 180° C. and preferably not over 160° C.

Representative of some of the oxazolidine esters of Formula II and Formula III are ethylene glycol bis-oxazolidinyl propionate, 1,4-butylene glycol bis-oxazolidinyl propionate, ethylene glycol bis-isopropyloxazolidinyl propionate, butylene glycol bis-isopropyloxazolidinyl propionate, trimethylolpropane tris-isopropyloxazolidinyl propionate, lauryl oxazolidinylpropionate, stearyl oxazolidinylpropionate, methyl oxazolidinylpropionate, methyl isopropyloxazolidinylpropionate, phenyl oxazlidinylpropionate, and pentaerythritol tetra-isopropyloxazolidinylpropionate.

Representative polyols that may be used in the transesterification reaction are those which contain at least two hydroxyl groups and are substantially free from other functional groups containing active hydrogen. Illustrative polyols include the polyoxyalkylene polyols containing one or more chains of connected oxyalkylene groups which are prepared by the reaction of one or more alkylene oxides with acrylic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethyleneoxybutylene glycols and polyoxypropyleneoxybutylene glycols. Included in the term "polyoxybutylene glycols" are polmers of 1,2-butylene oxide, 2,3-butylene oxide and 1,4-butylene oxide.

Other acyclic and alicyclic polyols which can be used include glycerol, trimethylolethane, ethylene glycol, propylene, glycol, trimethylolpropane, 1,2,6-hexanetriol, pentaerythritol, sorbitol, glycosides, such as methyl, ethyl, propyl, butyl and 2-ethylhexyl arabinoside, xyloside, fructoside, glucoside, rhammoside, and the like, and the polyethers prepared from such glycosides by reaction with ethylene oxide, propylene oxide, butylene oxide, or mixtures thereof, such as, for example, the alkylene oxide adduct of sucrose.

Further useful polyols are the mononuclear polyhydroxybenzenes such as resorcinol, pyrogallol, phloroglucinol, hydroquinone, 4,6-di-t-butylcatechol, catechol, resorcinol, methyl phloroglucinol, 2,5,6-trimethylresorcinol, 4-ethyl-5,6-dimethylresorcinol, n-hexylresorcinol, 4-chloro-5-methylresorcinol, and the like, fused ring systems such as 3-hydroxy-2-naphthol, 6,7-dihydroxy-1-naphthol, 2-hydroxyl-1-naphthol, 2,5-dihydroxy-1-naphthol, 9,10-dihydroxyanthracene, 2,3-dihydroxyphenanthrene, etc. and the polyethers prepared from these polyols by reaction with a 1,2-alkylene oxide such as ethylene, propylene, or butylene oxide.

Other polyols which can be employed are polynuclear hydroxybenzenes such as the various di- tri- and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound.

Exemplary diphenylol compounds include 2,2-bis (p-hydroxyphenyl) propane; bis(p-hydroxyphenyl) methane and the various diphenols and diphenylol methanes disclosed in U.S. Pat. No. 2,506,486, of Bender et al, granted May 2, 1950 and U.S. Pat. No. 2,744,882, of Bender et al, granted May 8, 1956, respectively.

Exemplary triphenylol compounds which can be employed include the alpha, alpha, omega, tris(hydroxyphenyl) alkanes such as
1,1,2-tris(hydroxyphenyl) ethanes;
1,1,3-tris(hydroxyphenyl) propanes;
1,1,3-tris(hydroxy-3-methylphenyl) propanes;
1,1,3-tris(dihydroxy-3-methylphenyl) propanes;
1,1,3-tris(hydroxy-2,4-dimethylphenyl) propanes;
1,1,3-tris(hydroxy-2,5-dimethylphenyl) propanes;
1,1,3-tris(hydroxy-2,6-dimethylphenyl) propanes;
1,1,4-tris(hydroxyphenyl) butanes;
1,1,4-tris(hydroxyphenyl)-2-ethylbutanes;
1,1,4-tris(dihydroxyphenyl) butanes;
1,1,5-tris(hydroxyphenyl)-3-methylpentanes;
1,1,8-tris(hydroxyphenyl) octanes;
1,1,10-tris(hydroxyphenyl) decanes, and the like.

Tetraphenylol compounds include the alpha, alpha, omega, omega, tetrakis(hydroxyphenyl) alkanes such as
1,1,2,2-tetrakis(hydroxyphenyl) ethanes;
1,1,3,3-tetrakis(hydroxy-3-methylphenyl) propanes;
1,1,3,3-tetrakis(dihydroxy-3-methylphenyl) propanes;
1,1,4,4-tetrakis(hydtoxyphenyl) butanes;
1,1,4,4-tetrakis(hydroxyphenyl)-2-ethylbutanes;
1,1,5,5-tetrakis(hydroxyphenyl) pentanes;
1,1,5,5-tetrakis(hydroxyphenyl)-3-methylpentanes;
1,1,5,5-tetrakis(dihydroxyphenyl) pentanes;
1,1,8,8-tetrakis(hydroxy-3-butylphenyl) octanes;
1,1,8,8-tetrakis(dihydroxy-3-butylphenyl)octanes;
1,1,8,8-tetrakis(hydroxy-2,5-dimethylphenyl) octanes;
1,1,10,10-tetrakis(hydroxyphenyl) decanes; and the corresponding compounds which contain substituent groups in the hydrocarbon chain such as
1,1,6,6-tetrakis(hydroxyphenyl)-2-hydrohexanes;
1,1,6,6-tetrakis(hydroxyphenyl)-2-hydroxy-5-methylhexanes;
1,1,7,7-tetrakis(hydroxyphenyl)-3-hydroxyheptanes; and the like.

Further description of the polyfunctional polyol ester oxazolidines of Formula II and monofunctional oxazolidines of Formula III can be found in U.S. Pat. application Ser. No. 768,906, of W. D. Emmons and J. F. Levy, filed Oct. 18, 1968, now U.S. Pat. No. 3,661,923, issued May 9, 1972.

A preferred class of polyfunctional polycarboxylic ester oxazolidines has the general formula

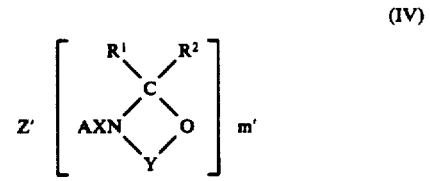

(IV)

wherein
$R^1$, $R^2$, X and Y are as defined above,
m' is an integer of at least two, preferably two or three,
Z' is a saturated, polyvalent, alkylene hydrocarbon radical, preferably having 1 to 38 carbon atoms, a phenylene group, a halo-substituted phenylene group, a ($C_1 - C_8$) alkyl-substituted phenylene group, the divalent hydrocarbon residue of 1,1,3-trimethyl-5-carboxy-3-(p-carboxy phenyl) indane, a ($C_2 - C_3$) unsaturated alkenyl divalent radical, or O=C<; and A is

(the left valence being connected to the Z' radical) or —O—, when Z' is O=C<;
Z' can be branched or straight-chain, and can be acyclic or contain a hydrocarbon ring.

Compounds of Formula IV can be produced by reacting a hydroxyl-terminated oxazolidine with an ester of a polybasic aliphatic or aromatic acid to effect the transesterification of the polyester. The monofunctional oxazolidine used as the transesterifying agent can be produced by reacting a secondary amine such as a secondary alkanolamine with an appropriate carbonyl compound such as an aldehyde or ketone to produce an N-hydroxy-alkyloxazolidine which is a cyclic amino alcohol of the general formula

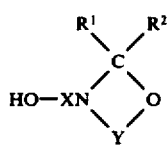

where X, R¹, R² and Y are as defined above.

The hydroxyalkyl compounds of Formula V used to react with the esters can be obtained by the reaction of a diethanolamine, a dipropanolamine, or similar di(hydroxyalkyl) amine with an aldehyde or ketone, particularly formaldehyde, acetone, glyoxal, acetaldehyde, methyl ethyl ketone, propionaldehyde, methyl propyl ketone, butyraldehyde, methyl isobutyl ketone, benzaldehyde, methyl isopropyl ketone, 2-ethylhexanal, cyclopentanone, diisobutyl ketone, cyclohexanone.

The preparation of the N-hydroxyalkyloxazolidines of Formula V is well known in the art. In general, they are prepared by reaction of di(hydroxylalkyl) amines with the ketones or aldehyde in the bulk or within an inert solvent such as xylene, benzene, or toluene, adapted to form an azeotrope with the water to aid in its removal. The mixture is heated to a temperature of 100° C. or higher depending on the pressure in order to distill water.

The transesterification reaction can, if desired, be catalyzed. Suitable catalysts include sodium salts of phenols, such as sodium phenoxide, p-hydroxydiphenylamine, or a tetraalkyl titanate such as the tetraisopropyl or tetrabutyl titanate. If the reaction is carried out using a tetraalkyl titanate as the catalyst, about one-half percent to about ten percent, preferably one to five percent, by weight of the titanate based on the weight of the oxazolidine is used. No solvent is needed. The starting materials can be used in stoichiometrically equivalent amounts, although the ester can be used in an excess amount. The alcohol liberated during the transesterification may be removed by azeotropic distillation of a mixture of the alcohol and the starting monomeric polyester or by fractional distillation. If desired, a polymerization inhibitor can be employed such as p-hydroxydiphenyl amine or diphenylphenylenediamine. The reaction is generally carried out at temperature of about 50° to about 180° C. and the completion of the reaction can be determined by measuring the amount of alcohol removed. The theoretical amount of alcohol that should be liberated out of the system by distillation is readily calculated.

An alkaline metal hydroxide can also be used as the transesterification catalyst, generally in the amount of from about 0.2% to about 5% and preferably from about 1 to about 3% by weight based on the weight of the starting oxazolidine. Sodium methoxide or sodium ethoxide as well as the potassium and lithium analogs can be used. An illstrative transesterification reaction would involve mixing of a starting oxazolidine and a polyester with a solution of the alkoxide in an alcohol, such as methanol. The alkoxide solution can be added gradually to the polyester-oxizalidine mixture. No additional solvent is needed. The temperature may be from 50° to about 180° C. and preferably not over 150° C.

In addition to the polyfunctional ester oxazolidines described above, certain carbonate diesters are within the scope of Formula IV. The carbonate diesters may be produced by a two-step transesterification process which involves (a) the preparaton of the monoester by reacting an N-(2-hydroxyalkyl)oxazolidine with an excess of dimethyl carbonate and (b) reacting the monoester with excess oxazolidine in an suitable solvent, such as toluene, to produce the carbonate diester.

When Z' in Formula IV is a radical having ethylenic unsaturation, the polyfunctional ester oxazolidines are characterized by at least two points of reactivity. The first reactive site is the double bond in the Z' portion by means of which the compounds are adapted to polymerize by the typical vinyl addition process to form linear polymers and copolymers. The second point of reactivity is in the cyclic oxazolidinyl radical itself which is preferentially hydrolyzable, to give a difunctional intermediate. In the compounds of Formula IV, there are always at least two cyclic radicals, both of which are preferentially hydrolyzable.

Representative of some of the polyfunctional ester oxazolidines of Formula IV are bis-oxazolidinylethyl adipate, bis-oxazolidinylethyl phthalate, bis-oxazolidinylethyl terephthalate, bis-oxazolidinylethyl isophthalate, bis-isopropyloxazolidinylethyl adipate, bis-isopropyloxazolidinylethyl phthalate, bis-isopropyloxizazolidinylethyl terephthalate, bis-isopropyloxazolidinylethyl isophthalate, and the bis-oxazolidinylethyl and bis-isopropyloxazolidinylethyl esters of 1,1,3-trimethyl-5-carboxy-3-(p-carboxyphenyl) indane.

The polyester starting material in the transesterfication reaction can be derived from an appropriate polycarboxylic acid such as saturated dicarboxylic acids, for example, oxalic, malonic, succinic, methylmalonic, isosuccinic, glutaric, adipic, and unsaturated dicarboxylic acid, for example, itaconic, maleic, fumaric, α-methyleneglutaric, an aromatic dicarboxylic acid, for example, phthalate, terephthalate, isophthalic, tetrachlorophthalic, mellitic, pyromellitic and 1,1,3-trimethyl-5-carboxy-3-carboxyphenyl) indane.

The unsaturated compounds of Formula IV can be copolymerized with various other ethylenically unsaturated monomers, and especially with various monoethylenically unsaturated monomers to produce linear copolymers. Thus, copolymers can be made containing from about 0.5% to 99.5% by weight of a compound of Formula IV with one or more of the following monomers: vinyl acetate, acrylonitrile, acrylamide, methacrylamide, styrene, halogen- or alkyl-substituted styrene, vinyl toluene, vinylidene chloride, vinyl chloride, vinyl laurate, unsubstituted or substituted esters of acrylic acid or methacrylic acid having from 1 to 18 carbon atoms in the alcohol moiety, such as methyl methacrylate, methyl acrylate, ethyl acrylate, butyl acrylate or methacrylate, cyclohexyl acrylate or methacrylate, 2-ethylhexyl acrylate or methacrylate, dodecyl acrylate or methacrylate, and octadecyl acrylate or methacrylate.

The polymers and copolymers of the compounds of Formula IV can be prepared by either a bulk, a solvent, using organic solvents such as acetone, dioxane, dimethylformamide, and acetonitrile, or an aqueous emulsion technique; and azo catalysts such as diazodiisobutyronitrile and dimethyl-α, α'-azodiisobutyrate. The preparation of azo catalyst or initiator may be between 0.1% and 5% and is preferably between about 0.5% and 1.5%, on the weight of the total polymerizable materials.

Compounds having Formula IV in which m' is one and Z' is a saturated monovalent aliphatic or aromatic radical are also useful in making the compositions of the invention. Such compounds can be produced by the procedures described above by reacting an oxazolidine having Formula V with an ester of a monobasic aliphatic or aromatic acid, such as the lower alkyl esters of acetic acid, propionic acid, butyric acid, benzoic acid, and the like.

Further description of the polyfunctional polycarboxylic oxazolidines can be found in U.S. Pat. application Ser. No. 768,905, of W. D. Emmons, filed Oct. 18, 1968, now U.S. Pat. No. 3,864,335.

A third preferred class of polyfunctional oxazolidinylalkyl acrylates and methacrylates having the formula

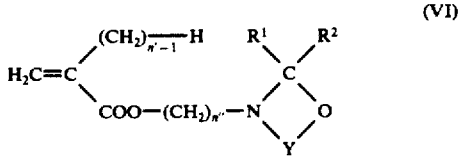

(VI)

wherein
$R^1$, $R^2$, and Y are defined as above,
n' is 1 or 2, and
n" is 2 or 3.

The preparation of these polymers and copolymers is disclosed in U.S. Pat. No. 3,037,006, of E. M. Hankins and W. D. Emmons, granted May 29, 1962, which is incorporated herein by reference.

Another preferred class of oxazolidines embraces those derived from simple aliphatic and aromatic diamines, such as those having the formula

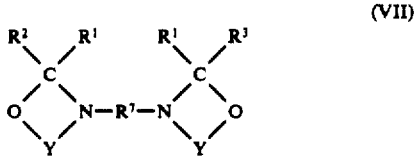

(VII)

wherein $R^1$, $R^2$, and Y are as defined above, and $R^7$ is a divalent, saturated or unsaturated, alkylene radical, preferably having 1 to 38 carbon atoms, a divalent arylene radical, preferably having 6 to 18 carbon atoms, or a divalent aralkylene or alkarylene radical, preferably having 7 to 25 carbon atoms. $R^7$ can also have substitutents such as nitro groups, halogen atoms, alkoxy groups, hydroxyl groups, or other groups which will not substantially interfere with the curing reaction, can be branched- or straight chain, and can be acyclic or contain a hydrocarbon ring.

Furthermore, oxazolidines derived from triamines, tetramines, and other polyamines are also useful in the invention. Such oxazolidines are also represented by the general formula

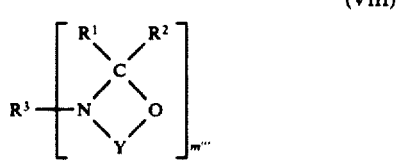

(VIII)

wherein $R^1$, $R^2$, and Y are as defined above, $R^3$ is a polyvalent alkylene, arylene, aralkylene or alkarylene radical similar to $R^7$ above, and m'" is an integer equal to the valence of $R^3$.

Oxazolidines having Formula VII or Formula VIII are well known in the art. Generally, such compounds can be prepared from a polyamine by first reacting to amine with an alkylene oxide, such as ethylene oxide, propylene oxide, or related compound, to form the corresponding alkanolamine, followed by reaction with an aldehyde or ketone to form the oxazolidine compound. Other methods well known in the art can also be used in preparing these oxazolidines.

Examples of oxazolidines having Formula VII or Formula VIII include
1,2-bis(1,3-oxazolidin-3-yl) ethane,
1,8-bis(1,3-oxazolidin-3-oxazolidin-3-yl) menthane,
bis[4-(3-oxazolidinyl)phenyl] methane,
bis(1,3-oxazolidin-3-yl) methane,
2-nitro-1,3-bis(1,3-oxazolidin-3-yl) propane,
and related compounds disclosed in U.S. Pat. No. 3,160,634, of Hodge, granted Dec. 8, 1964,
1,1-bis(1,3-tetrahydrooxazin-3-yl) methane,
bis(1,3-oxazolidin-3-yl) toluene,
bis(1,3-oxazolidin-3-yl) xylene,
1,6-bis(1,3-oxazolidin-3-yl) hexane,
1,12-bis(1,3-oxazolidin-3-yl) dodecane,
2,2,4-trimethyl-1,6-bis(1,3-oxazolidin-3-yl) hexane,
3,5,5-trimethyl-1-(1,3 -oxazolidin-3-yl)-3-[(1,3-oxazolidin-3-yl)methyl cyclohexane,
1,6-bis(1,3-oxazolidin-3-yl) hexene-3,
and the like. Other oxazolidines can be prepared readily from other well known polyamines.

Furthermore, other types of oxazolidines which are well known in the art are also useful in the compositions of the invention. Included amoung these compounds are the dioxazolidines, such as 2,2'-bis(oxazolidine), 2,2'-bis (N-methyloxazolidine), and the like.

B. THE KETOXIME-BLOCKED ISOCYANATE COMPONENT

The ketoxime-blocked isocyanates are easily prepared by reacting an isocyanate with a ketoxime. Generally, the reaction proceeds readily when the oxime and the isocyanate are mixed in a solvent which is inert to the reaction, such as benzene, toluene, xylene, or similar unreactive hydrocarbon. The ketoximes are prepared by the well-known reaction of hydroxylamine hydrochloride with a ketone, or of course, other well-known methods for preparing ketoximes, such as reaction of a hydrocarbon with nitrosyl chloride, according to the procedure of Naylor and Anderson, J. Org. Chem. 18.115(1953). A wide variety of ketoximes can be used to make the blocked isocyanates. The choice of ketoxime is not critical and will depend mainly on the cost of the starting ketone, and may also depend in part on the volatility of the oxime. Among the oximes which can be used in making the ketoxime-blocked isocyanates are acetone oxime, 2-butanone oxime, 3-methyl-2-butanone oxime, 2-pentanone oxime, 3-pentanone oxime, 4-methyl-2-pentanone oxime, 2-heptanone oxime, 3-heptanone oxime, cyclohexanone oxime, actophenone oxime, and the like. An especially preferred ketoxime is the oxime of 2-butanone.

Substantially any polyisocyanate, including prepolymers having terminal —NCO groups, can be used in making the blocked isocyanates for the compositions of the invention. As used in the present specification and claims, the terms "polyisocyanate" and "polyfunctional isocyanate" mean any compound, monomeic or polymeric, having two or more —NCO groups. The isocyanates which are used in the compositions of the invention are known materials.

Among the polyisocyanates which can be used in the compositions of the invention are aliphatic isocyanates such as 1,6-hexamethylene diisocyanate, 1,8-octamethylene diisocyanate, 1,12-dodecamethylene diisocyanate, 2,2,4-trimethylhexamethylene diisocyanate, and similar alkylene diisocyanates, 3,3'diisocyanatodipropyl ether, 3-isocyanatomethyl-3,5,5-trimethylcyclohexyl isocyanate, cyclopentylene-1, 3-diisocyanate, cyclohexylene-1,4-diisocyanate, methyl 2,6-diisocyanatocaproate, and related isocyanates, bis(2-ispocyanatoethyl) fumarate, 4-methyl-1,3-diisocyanatocyclohexane, trans-vinylene diisocyanate and similar unsaturated isocyanates, 4,4'-methylene-bis(cyclohexyl isocyanate), and related isocyanates, methane diisocyanate, N,N',N"-tris(6-isocyanatohexamethylene) biuret, and related isocyanates, bis)2-isocyanatoethyl) carbonate, and similar carbonate diisocyanates, as well as other known isocyanates derived from aliphatic polyamines, aromatic isocyanates, such a tolylene diisocyanates, xylylene diisocyanates, dianisidine diisocyanate, 4,4'-diphenylmethane diisocyanate, 1-ethoxy-2,4-diisocyanatobenzene, 1-chloro-2,4-diisocyanatobenzene, tris(4-isocyanatophenyl) methane, naphthalene diisocyanates, fluorene diisocyanates, 4,4'-biphenyl diisocyanate, phenylene diisocyanates, 3,3'-dimethyl-4,4'-biphenyl diisocyanate, p-isocyanatobenzyl isocyanate, tetrachloro-1,3-phenylene diisocyanate, and related isocyanates, 2,4,6-tribromo-1,3-phenylene diisocyanate, bis)2-isocyanatotheyl) benzene, prepolymers of polyisocyanates with polyhydroxyl or polyamine compounds, such as, prepolymers of 3-isocyanatomethyl-3,5,5-trimethylcyclohexylisocyanate, tolylene diisocyanate, mentane diisocyanate, 4,4'-methylenebis (cyclohexylisocyanate), 4,4'-methylene-bis(isocyanatocyclohexane), 2-isocyanatoethyl-6-isocyanatocaproate, and the like with polyether polyols, polyester polyols, and the like.

The preparation of the isocyanate prepolymers useful in the compositions of the invention is well known in the art. Generally, the preparation of these prepolymers involves the reaction of a polyol, polyether, hydroxyl-terminated polyester, polyester amide, or other polyfunctional active hydrogen compound, with a diisocyanate or other polyisocyanate, preferably using an excess of the isocyanate to yield an isocyanate terminate prepolymer product. An extensive description of some of the useful techniques for preparing the isocyanate prepolymers can be found in J. H. Saunders and K. C. Frisch, Polyurethanes: Chemistry and Technology, Part II, Interscience (New York 1964), especially on pages 8 to 49, and in the various references cited by Saunders and Frisch. Other preparative techniques which are known in the art can also be employed.

Other polyfunctional isocyanates which are useful in the compositions of the invention are disclosed in U.S. Pat. No. 3,162,664, of Brotherton et al., granted Dec. 22, 1964, U.S. Pat. No. 3,427,346, of Brotherton et al., granted Feb. 11, 1969, U.S. Pat. No. 3,275,679, of Brotherton et al., granted Sept. 27, 1966, U.S. Pat. No. 3,352,830 of Schmitt et al., granted Nov. 11, 1967, U.S. Pat. No. 2,729,666 of Stallman, granted Jan. 3, 1956, U.S. Pat. No. 2,768,154 of Unruh et al., granted Oct. 23, 1956, U.S. Pat. No. 3,267,122 of Lehmann et al., granted Aug. 16, 1966, U.S. Pat. No. 3,281,378, of Garber et al., granted Oct. 25, 1966, U.S. Pat. No. 3,124,605, Wagner, granted Mar. 10, 1964, U.S. Pat. No. 2,718,516, of Bortnick, granted Sept. 20, 1955, as well as isocyanates prepared from the amines disclosed in U.S. Pat. No. 3,256,318, of Brotherton et al., granted June 14, 1966. Other polyisocyanates, such as those containing silicon and phosphorous can also be used in making the compositions of the invention.

Another useful class of polyfunctional aliphatic isocyanates are the ester isocyanates represented by the formulas

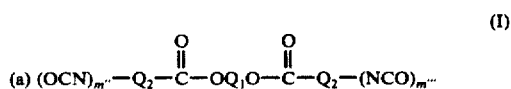

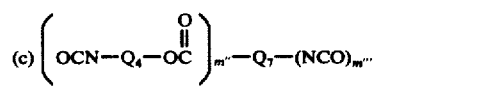

wherein m" and m'" are either one or two; $Q_1$ is the diester residue of an alkane or cycloalkane diol having two primary hydroxyl groups, preferably from 2 to 18 carbon atoms, and up to one hetero oxygen or sulfur atom; $Q_2$ and $Q_3$ are divalent alkylene or cycloalkylene radicals, preferably having 1 to 18 carbon atoms; $Q_4$ is an alkylene or cycloalkylene radical, preferably having 2 to 8 carbon atoms, and up to one hetero oxygen or sulfur atom; $Q_5$ is a divalent arylene or aralkylene radical, preferably having 6 to 18 carbon atoms; $Q_6$ is an alkylene or cycloalkylene radical, preferably having 2 to 8 carbon atoms, and up to one hetero oxygen or sulfur atom; and $Q_7$ is a divalent alkylene or cycloalkylene radical, preferably having 1 to 18 carbon atoms.

The isocyanates of Formulas I, II, and III are prepared by phosgenation of the corresponding amine hydrochlorides. The amino groups of these amines are provided in whole or in part by an amino acid. The amino acids which are useful in preparing isocyanates of Formulas I, II, and III are the monoamino-monocarboxylic acids, the monoamino-dicarboxylic acids, the diamino-monocarboxylic acids diamino-dicarboxylic acids and lactams having 3 to 12 carbon atoms in the ring. The amine hydrochlorides in which the amino groups are provided in part by an amino acid are produced by reacting one or more of the designated class of amino acids in its acid salt form with an alkanolamine hydrochloride. The amine hydrochlorides in which the amino groups are provided wholly by an amino acid are produced by reacting a monoamino-monocarboxylic acid or a lactam with a monohydroxy or dihydroxy alcohol (hereinafter referred to as "alcohols" and "diols", respectively), the amino groups being converted to acid salt form before the esterification reaction. In addition, compounds containing four amine hydrochloride groups are produced by reacting a diamino-monocarboxylic acid with a diol. Preferably these esterification reactions are carried out while passing a stream of hydrogen chloride gas through the reaction mixture while the esterification proceeds.

To produce the acryl-containing amine hydrochlorides useful in preparing isocyanates of Formulas I, II, and III, the amino groups of the amino acid are first converted to acid salt form by reaction with a strong acid, Preferably hydrochloric acid, and the resulting product is the reacted with an alkanolamine (also converted to a strong acid salt as the hydrochloride), an alcohol or a diol in an inert liquid reaction medium. The amino acid and the alcohol, diol or alkanolamine must have a significant solubility in each other under the reaction conditions, or the inert liquid used as the reaction medium must be a mutual solvent for these materials. The reaction temperature may be from about 40° C. to the temperature at which the amine acid salts present in the reaction mixture dissociate to form the free amine. Preferably the reaction is carried out at from about 50° C. to 180° C. Desirably an esterification catalyst is used to promote the reaction. Suitable catalysts include, for example, hydrogen chloride, chlorosulfonic acid, p-toluenesulfonic acid, and the like. In a preferred preparative technique, a stream of hydrogen chloride gas is passed through the reaction mixture while the reaction proceeds, in which case no separate catalyst for the esterification is needed. Means should be provided to distill off or otherwise remove the water formed during the esterification. The reaction may be carried out at sub-atmospheric or super-atmospheric pressures but preferably is carried out at atmospheric pressure. Liquid reaction media which may be used for the esterification include aromatic hydrocarbons, chlorinated aromatic hydrocarbons, chlorinated aliphatic hydrocarbons, chlorinated alicyclic hydrocarbons, tetramethylenesulfone, and other organic solvents which are inert to the reaction. When one of the reactants is a liquid or is molten under the reaction conditions, an excess of such reactant may be used as the reaction medium so long as such excess does not cause polymerization or promote other undesirable side-reactions. In certain instances where the reaction product itself is a liquid under the reaction conditions, it apparently acts as the inert liquid, the initial esterification forming the first quantities of such product occurring in the presence of water (which is later distilled off as esterification proceeds) which is a solvent for the amine hydrochlorides.

When a lactam is used as the amino acid, desirably water (preferably about one mole per mole of lactam) is added along with a strong acid (preferably hydrochloric acid) to facilitate opening the ring. An undue excess of water is to be avoided since it must be removed during the esterification. The lactam may be first heated in contact with the water-acid mixture to open the ring, and then the alcohol, diol or alkanolamine added along with an inert organic liquid and an azeotropic agent and the ester prepared as described above preferably using a stream of hydrogen chloride gas. Alternatively, all the reagents may be charged initially, the mixture heated without removal of water for a sufficient time to open the ring, and then the water is removed causing esterification to proceed. In this latter case, it is sometimes desirable to carry out the ring opening step in a sealed pressure vessel under autogenous pressure. Other variations may also be used, as initially charging all the materials except the azetropic agent which is added after ring opening. The use of water in this manner is not essential and good results have been obtained without its use.

The amine hydrochlorides produced in this manner can be converted to the corresponding isocyanates by reaction with phosgene or other carbonyl dihalide.

Phosgene may be employed in either liquid or gaseous form. The amine hydrochloride is dispersed in an inert liquid reaction medium, phosgene added, preferably in excess of that needed to react quantitatively with the amino groups present, and the temperature of the reaction medium maintained at from about 100° C. to 225° C. The molar ratio of phosgene to amine hydrochloride group may be from about 1.1:1 to 10:1 and preferably is at least 2:1. Suitable liquid reaction media include aromatic hydrocarbons, chlorinated aromatic hydrocarbons, chlorinated aliphatic hydrocarbons, chlorinated alicyclic hydrocarbons, and other organic solvents inert to the phosgenation reaction. The phosgenation may also be carried out in steps. A purified amine hydrochloride may be used for the phosgenation or, if desired, the crude reaction product of the reaction between the amino acid and the alkanolamine hydrochloride, alcohol or diol may be used.

The alkanolamines which are useful in preparing isocyanates of Formulas I, II, and III preferably contain from 2 to 8 carbon atoms, have one primary or secondary hydroxyl group and one primary amino group and may include one hetero oxygen or sulfur atom in the alkyl chain. The alkyl group of the alkanolamine can be substituted with inert substituent groups as alkyl, nitro, halogen, alkoxy, etc. Particularly preferred alkanolamines are ethanolamine, 2-(2-aminoethoxy)-ethanol, 1-amino-2-propanol, 2-amino-1-propanol, 2-methyl-2-amino-1-propanol, 3-amino-1-propanol and 2-amino-1-butanol. Mixtures of alkanolamines can be used.

The diols which can be used are those having two primary hydroxyl groups, preferably from 2 to 18 carbon atoms, and can be aliphatic, such as for example alkane, alicyclic, such as for example cycloalkane, or arenedialkyl, The diols can have a hetero oxygen or sulfur atom and can be substituted with inert substituent groups as alkyl, nitro, halogen, alkoxy, etc. Among the diols which can be used are the $\alpha$, $\omega$-aliphatic diols, p-bis-(hydroxymethyl) cyclohexane, p-phenylenedimethylene diol, diethylene glycol, and the like. Mixtures of diols can be used.

Any alcohol can be used which has either a primary or secondary hydroxyl group. The alcohol can be aliphatic, alicyclic or aralkyl. Preferred alcohols are the aliphatic alcohols such as alkanols having from six to twenty-four carbon atoms. Like the other reactants, the alcohol can contain inert substituent groups. Further, the alcohol can contain one hetero oxygen or sulfur atom. Suitable alcohols include arachidyl, behenyl, benzyl, tetrahydrofurfuryl, phenylpropyl, tridecyl, trimethylnonyl, stearyl, cyclophenyl, hexyl, isoctyl, and the like.

The amino acids which can be used in preparing isocyanates of Formulas I, II, and III can be either optically active or inactive and include monoamino monocarboxylic acids such as alanine, isoleucine, 3-aminobutyric acid, 3-aminopropionic acid, 3- amino-2-methyl propionic acid, phenylalanine, p-aminobenzoic acid, methionine, $\omega$-amino acids generally, etc.; monoamino-dicarboxylic acids such as aspartic acid and glutamic acid; diamino-monocarboxylic acids such as lysine and ornithine; diamino-dicarboxylic acids such as lanthionine; and lactams such as $\beta$-methyl-$\beta$-butyrolactam, $\alpha,\beta$-dimethylbutyrolactam, $\alpha,\alpha',\beta$-trimethylbutyrolactam, $\beta$-carbomethoxy-$\beta$-butyrolactam, $\beta$-phenyl-$\beta$-propiolactam, $\beta$-methyl-$\beta$-caprolactam, $\beta$-methyl-$\beta$-valerolactam, $\beta$-ethyl-$\beta$-valerolactam, 2-pyrrolidone, 6-methyl-2-piperidone, 3-methyl-$\epsilon$-caprolactam and 7-methyl-ε-caprolactam. The amino acids can be substituted with inert substituent groups as alkyl, alkoxy, nitro, halogens, and the like, and may contain one or more hetero atoms which do not interfere with the esterification reaction, and, where applicable, the subsequent phosgenation. Mixtures of amino acids may be used. The diaminomonocarboxylic acids disclosed in French Pat. No. 1,351,368 can be used. Amino acids occur widely in nature and a number of synthesis methods are available for their production from inexpensive raw materials. Thus the addition of ammonia to an unsaturated acid may be used to produce inexpensive amino acids for use in the instant invention.

Further description of the preparation of the isocyanates of Formulas I, II, and III can be found in United States patent application Ser. No. 518,977, of W. D. Emmons and J. F. Levy, filed Jan. 6, 1966, now U. S. Pat. No. 3,567,763, granted on Mar. 2, 1971.

C. OPTIONAL COMPONENTS, METHODS OF APPLICATION, AND CURED PRODUCTS

The compositions of the invention need not contain a solvent, but a suitable inert solvent can be added to the compositons, if desired, either at the time of original formulation or at the time of use. The rate of reaction of the unblocked isocyanate with the copolymer can be influenced by the presence of a solvent. Included among the solvents which can be used are toluene, xylene, liquid aliphatic hydrocarbons, isopropyl ether, ethyl acetate, α-ethoxyethyl acetate, methyl ethyl ketone, and the like, as well as mixtures of such solvents. Pigments, dyes, fillers, antioxidants and antiozodants, stabilizers, flow control agents, or other optional ingredients can also be included in the compositions of the invention. Water is necessary to initiate the reaction between the ketoxime-blocked polyisocyanate and the oxazolidine; the water can be supplied by the atmosphere, or can be added directly, or water already present in pigment can be employed.

The compositions of the present invention are adapted to be applied in any suitable fashion to the substrate to be coated such as by brushing, spraying, dipping, roller coating, or by any other suitable method kown in the art. After application, the compositions are cured by heating.

The compositions of the invention can be used for the coating of a wide variety of substrates including metals, paper, textiles, leather, wood, ceramics, brick, plastic, rubber, stone, and concrete surfaces.

As stated above, the compositions, after application to the substrates to be coated, are cured by heating. The curing process comprises the unblocking of the isocyanate followed by the reaction of the free isocyanate with the ring-opened oxazolidine. In order to facilitate the curing of the coating, a catalyst can be added to the compositions of the invention. When no catalyst is added to the composition, the curing reaction can generally be effected at a temperature of about 125° to about 325° F. When a catalyst is added to the composition, the curing reaction will generally proceed satisfactorily at temperatures as low as about 110° F. or below in a 30 minute bake schedule. A particularly preferred curing schedule is 110° F to 125° F. for 30 minutes.

The curing reaction can be catalyzed, if desired, by any of the known "unblocking" catalyst, including lead octoate, stannous octoate, dibutyl tin salts, such as dimethylbutane diamine, metallic naphthenates, metallic acetylacetonates, and the like. However, it has been unexpectedly found that organosoluble zinc salts are superior catalyst for the curing reaction. Among the organo soluble zinc salts which are particularly useful are zinc chloride, zinc naphthenate, and the organosoluble zinc salts of monocarboxylic alkenoic or alkanoic acids having 4 to 18 carbon atoms, including zinc caproate, zinc octoate, zinc laurate, zinc palmitate, zinc cuprate, zinc linoleate, zinc pentadecanonoate, and the like. The catalyst salts must be organosoluble. As the term is used herein, "organosoluble" means that the material has appreciable solubility, that is, at least about 0.05% by weight, in common solvents such as ethanol, acetone, ether, methylethyl ketone, or hydrocarbons such as toluene, and must be soluble to a similar extent in the liquid reaction mixture which contains the blocked isocyanate. When a catalyst is included in the coating compositions, any amount which will give the desired degree of catalysis can be used. Generally, the catalyst will be present in the composition in an amount of about 0.2 to about 3% by weight, and preferably about 1 to about 2.5% by weight, based on the weight of the coating solids, but a lesser or greater amount may be used advantageously in some compositions. The compositons containing the oxazolidine-containing material and the blocked isocyanate are present in a ratio wherein the molar equivalents of ketoxime-blocked polyisocyanate to oxazolidine is about 1:10 to 2.5:1, preferably between about 1:1.1 and 2.5:1.

The following examples will further illustrate the preparation and use of the coating compositions of the invention, but are not intended to limit the invention in any way. Parts and percentages are by weight unless otherwise stated.

EXAMPLES

In the following examples, the following abbreviations are used:

OX-1 is a 40% solid oxazolidine polymer in toluene of an equivalent weight of 460 which is a copolymer of methyl methacrylate (MMA), styrene (St), butyl acrylate (BA), and 2-oxazolidine ethyl methacrylate (OX-EMA) prepared from the following weight ratios of monomers: MMA/St/BA/OXEMA, 20/20/40/20.

Polyol-1 is a hydroxyl functional polymer of the monomers MMA/St/BA/HEMA/MMA, 10/25/50/10/5, (50% solids in xylene) wherein HEMA is 2-hydroxyethyl methacrylate and MMA is methacrylic acid.

ISO-1 is an isocyanate prepolymer prepared from slightly over two moles isophorone diisocyanate to one mole propylene glycol.

ISO-2 is ISO-1 blocked with 2-butanone oxime, i.e., a ketoxime-blocked polyisocyanate.

ISO-3 is $C_{36}$ aliphatic diisocyanates.

ISO-4 is ISO-3 blocked with 2-butanone oxime.

ISO-5 is ISO-3 blocked with dimethyl ketoxime (acetone oxime).

OX-2 is an acrylic substituted oxazolidine of equivalent weight of 270 which is BMA/OXEMA, 65/35.

OX-3 is an oxazolidine functional ester of equivalent weight 96 which is bis[2(2-isopropyloxazolidinyl) ethyl] adipate.

OX-4 is an oxazolidine of 460 equivalent weight which is MMA/BA/OXEMA, 20/60/2.

Zn or Sn are introduced as zinc or tin octoate solutions, but the indicated weight % is based on metal content.

The following test methods are used:

A. Hardness — Tukon microhardness tester from Wilson Mechanical Instrument Company, using a Filar Micrometer eyepiece to convert diamond imprint to Filar units which are converted to Knoop Hardness Numbers (KHN) which increase with increasing hardness.

B. Impact — Gardner Laboratories, Inc., Variable Impact Tester. Direct impact is measured with the painted surface facing the impact weight. Reverse impact is measured with the painted surface facing away from the impact weight.

C. Print — To measure the thermoplasticity or crosslink density of coatings, a small piece of openweave cheesecloth is placed on coating, topped by a leather disc and topped further by a series of weights sufficient to bring the pressure on the leather disc to a pressure of 2 psi. The assembly is then placed in a 180° F. oven for 30 minutes, and immediately upon removal the coating is visually examined for imprint or markings, and rated as no trace, moderate, heavy, or very heavy printing.

D. Finger Tack — A subjective rating of tackiness of a coating by operator impressing his finger with moderate pressure and rating the task to remove.

As utilized herein, the term 'oxazolidine" is used to encompass only those oxazolidines which are capable of being hydrolyzed and which will react with a polyisocyanate to produce a polymeric product when subjected to an elevated temperature.

EXAMPLE 1

A. Equal amounts on an equivalent basis of OX-1 and ISO-4 are mixed to make one component coating composition. The composition has an infinite pot life as determined by lack of increase in viscosity when stored in a sealed container at 140° F. accelerated aging for three weeks. The coating composition is applied in 1.0-1.5 dry mil film on a steel panel. Zinc catalyst levels of 0, 0.2, 0.4, and 1.0% were used, and bake temperatures of 250° F., 275° F., and 300° F. were used, all at 30 minutes.

The results are reported in Table I.

B. Example 1A was repeated but substituting ISO-5 for ISO-4.

C. Example 1A was repeated but substituting ISO-2 for ISO-4.

EXAMPLE 2 - Comparative

An analogous one component system, that of prior art U. S. Pat. No. 3,694,389, using A. Polyol-1 and ISO-4 in one system, and
B. Polyol-1 and ISO-2 in another system, is applied to steel and cured in the same way as Example 1, with the results also reported in Table 1.

The systems of Example 1 were better at 250° F. cure than the systems of Example 2.

TABLE I

| Ex. | Bake Temperature ° F., (30 Mins.) | %Zn on Binder | Hardness (KHN) | Print | Reverse Impact(in.-lbs.) | Finger Tack |
|---|---|---|---|---|---|---|
| 1C | 250 | 0.2 | 7.10 | Med.-Heavy | <2 | |
| 2B | 250 | 0.2 | 1.62 | Very Heavy | <2 | |
| 1C | 250 | 1.0 | 6.84 | Lt.-Med. | <2 | |
| 2B | 250 | 1.0 | 2.40 | Heavy | <2 | |
| 1C | 275 | 1.0 | 12.1 | Lt. | 140 | |
| 2B | 275 | 1.0 | 6.4 | Med. | <2 | |
| 1C | 250 | 0 | 2.20 | Very Heavy | <2 | |
| 2B | 250 | 0 | 1.19 | Very Heavy | <2 | |
| 1C | 275 | 0 | 5.93 | Med. Heavy | <2 | |
| 2B | 275 | 0 | 2.3 | Very Heavy | <2 | |
| 1C | 300 | 0 | 12.2 | Med. | 130 | |
| 2B | 300 | 0 | 7.3 | Med. | >140 | |
| 1A | 250 | 0.4 | 1.9 | Trace | >100 | None |
| 1B | 250 | 0.4 | 1.6 | Trace | >100 | None |
| 2A | 250 | 0.4 | 0.4 | Very Heavy | >100 | Med. |
| 1A | 300 | 0.4 | 2.9 | Trace | >100 | None |
| 1B | 300 | 0.4 | 2.6 | Trace | >100 | None |
| 2A | 300 | 0.4 | 1.3 | Trace | >100 | |

EXAMPLE 3 - Comparative

A coating composition in accordance with prior art U.S. Pat. No. 3,743,626 of equimolar amounts of OX-1 and ISO-1 began to cure at room temperature, and thus could not be considered as a one-component storage-stable composition. However, it had properties, when cured, at 250° F. for 30 minutes which were better than those of Example 1.

EXAMPLE 4

Pigmented analogues of Example 1A were made, with a T$_i$O$_2$ pigment to binder ratio of ⅔, but reduced to a solids content of 50% by adding xylene solvent and applied to treated steel plates using a 5 mil filmograph.

The results of tests on the cured pigmented coatings are reported in Table II. It will be noted that in the examples the curing temperature is between 225° F. and 300° F.

Each composition had 0.4% Zn catalyst.

EXAMPLE 5

Example 1A is repeated but substituting OX-2 for OX-1, with equivalent results.

EXAMPLE 6

Example 1A is repeated but substituting OX-3 for OX-1 with similar results.

EXAMPLE 7

Example 1 is repeated, but substituting OX-4 for OX-1, with very similar results.

TABLE II

| Bake Temp. ° F., 30 Mins. | Hardness (KHN) | Print | Direct Impact | Reverse Impact (in.-lbs.) | Whiteness (K)[1] | 20°/60° Gloss[2] |
|---|---|---|---|---|---|---|
| 225° F. | 1.4 | Lt. Med. | >100 | >100 | 7.0 | 83/96 |
| 250° F. | 3.1 | Very Lt. | >100 | >100 | 6.6 | 84/96 |

TABLE II-continued

| Bake Temp. °F., 30 Mins. | Hardness (KHN) | Print | Direct Impact | Reverse Impact (in.-lbs.) | Whiteness (K)[1] | 20°/60° Gloss[2] |
|---|---|---|---|---|---|---|
| 300° F. | 4.1 | Trace | >100 | >100 | 9.0 | 75/96 |

[1]Lower K indicates whiter surface, as determined by method described by S. Gusman, Resin Review, No. 6, Dec. 1952
[2]Standard Gardner glass meter

I claim:

1. A low temperature curing, one-component thermosetting coating composition comprising an oxime-blocked polyisocyanate and an oxazolidine, said oxazolidine being hydrolyzable by moisture at a temperature of between about 125° F. and 325° F. the hydrolysis product of which can react with a polyisocyanate, to produce a polymeric product.

2. A composition according to claim 1 wherein the oxazolidine has the formula

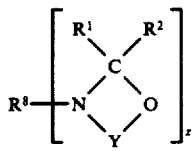

wherein
$R^1$ is a hydrogen atom, a phenyl group, a benzyl group, or a
$(C_1 - C_{12})$alkyl group, and
$R^2$ is a hydrogen atom or a $(C_1 - C_4)$ alkyl group, or
$R^1$ and $R^2$ are taken together with the attached carbon atom to form a saturated five- or six-membered saturated carbon ring, and Y is the radical

ps wherein
$n$ is 2 or 3, and
$R^3$ and $R^4$ are, individually, hydrogen atoms, $(C_1-C_{12})$ alkyl groups, $(C_6 - C_{10})$ aryl groups, or $(C_7 - C_{12})$ aralkyl or alkaryl groups,
$R^8$ is a saturated or unsaturated alkyl or polyvalent alkylene radical having up to 38 carbon atoms, and aralkyl, alkaryl, polyvalent aralkylene, or polyvalent alkarylene radical having up to 25 cabon atoms, or an aryl or polyvalent arylene radical having up to 18 carbon atoms, and z is an integer equal to the valence of $R^8$.

3. A composition according to claim 1 wherein the oxazolidine has the formula

wherein $R^1$ is a hydrogen atom, a phenyl group, a benzyl group, or a $(C_1 - C_{12})$ alkyl group, and $R^2$ is a hydrogen atom or a $(C_1 - C_4)$ alkyl group, or $R^1$ and $R^2$ are taken together with the attached carbon atom to form a saturated five-or six-membered saturated carbon ring, and Y is the radical

wherein $n$ is 2 or 3, and $R^3$ and $R^4$ are individually, hydrogen atoms, $(C_1 - C_{12})$ alkyl groups, $(C_6 - C_{10})$ aryl groups, or $(C_7 - C_{12})$ aralkyl or alkaryl groups, Z is a divalent alkylene, a tri- or tetravalent hydrocarbon radical, or a monovalent $(C_1 - C_{18})$ alkyl group, a $(C_3 - C_{18})$ alkyl group, a $(C_3 - C_{14})$ cycloalkyl group, a $(C_6 - C_{14})$ aryl group, or a $(C_7 - C_{12})$ aryl group, or a $(C_7 - C_{15})$ aralkyl or alkaryl group, X is the radical

wherein q is an integer of 2 to 4, and $R^5$ and $R^6$ are individually selected from hydrogen or unsubstituted or substituted $(C_1 - C_6)$ alkyl groups, and m is an integer of one to four, and is equal to the valence of Z.

4. A composition according to claim 1 wherein the oxazolidine has the formula

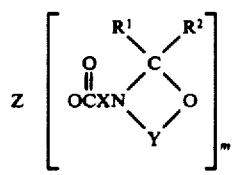

wherein $R^1$ is a hydrogen atom, a phenyl group, a benzyl group, or a $(C_1 - C_{12})$ alkyl group, and $R^2$ is a hydrogen atom or a $(C_1 - C_4)$ alkyl group, or $R^1$ and $R^2$ are taken together with the attached carbon atom to form a saturated five or six-membered saturated carbon ring, and Y is the radical

wherein $n$ is 2 or 3, and $R^3$ and $R^4$ are, individually, hydrogen atoms, $(C_1 - C_{12})$ alkyl groups, $(C_6 - C_{10})$ aryl group, or $(C_7 - C_{12})$ aralkyl or alkaryl groups. X is the radical

wherein q is an integer of 2 to 4, and $R^5$ and $R^6$ are, individually, hydrogen or unsubstituted or substituted $(C_1 - C_6)$ alkyl groups, Z' is a saturated, polyvalent alkylene radical having up to 38 carbon atoms, a polyvalent phenylene group, a polyvalent halo-substituted phenylene group, a $(C_1 - C_8)$ alkyl-substituted phenylene group, the divalent hydrocarbon residue of 1,1,3-trimethyl-5-carboxyl-3-(p-carboxyphenyl)indane, an unsaturated divalent alkenyl radical having 2 to 3 carbon atoms, or a O=C< group,

(the left valence being connected to the Z' radical) or —O—, when Z' is O=C<, and m' is an integer of at least two, and is equal to the valence of Z'.

5. A composition according to claim 1 wherein the oxazolidine is a polymer of an unsaturated oxazolidine of the formula

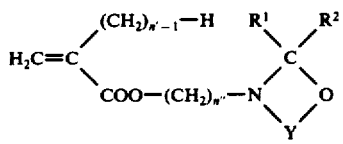

wherein $R^1$ is a hydrogen atom, a phenyl group, a benzyl group, or a $(C_1 - C_{12})$ alkyl group, and $R^2$ is a hydrogen atom or a $(C_1 - C_4)$ alkyl group, or $R^1$ and $R^2$ are taken together with the attached carbon atom to form a saturated five- of six-membered saturated carbon ring, and Y is the radical

whrein n is 2 or 3, and $R^3$ and $R^4$ are, individually, hydrogen atoms, $(C_1 - C_{12})$ alkyl groups, $(C_6 - C_{10})$ aryl groups, or $(C_7 - C_{12})$ aralkyl or alkaryl groups, n' is 1 or 2, and n" is 2 or 3.

6. A composition according to claim 1 wherein the oxazolidine has at least one substituent of the formula

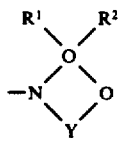

wherein $R^1$ is a hydrogen atom, a phenyl group, a benzyl group, or a $(C_1 - C_{12})$ alkyl group, and $R^2$ is a hydrogen atom or a $(C_1 - C_4)$ alkyl group, or $R^1$ and $R^2$ are taken together with the attached carbon atom to form a saturated five- or six-membered saturated carbon ring, and Y is the radical

wherein n is 2 or 3, and $R^3$ and $R^4$ are, individually, hydrogen atoms, $(C_1 - C_{12})$ alkyl groups, $(C_6 - C_{10})$ aryl groups, or $(C_7 - C_{12})$ aralkyl or alkaryl groups.

7. Composition according to claim 6 wherein n is 2, $R^3$ is a hydrogen atom, and $R^4$ is a hydrogen atom.

8. A composition according to claim 7 wherein the ratio of molar equivalents of ketoxime-blocked polyisocyanate to oxazolidine is about 1:10 to 2.5:1.

9. A composition according to claim 8 wherein the ratio is about 1:1.1 to 2.5:1.

10. A process for forming a polymeric material which comprises contacting with water a composition comprising a ketoxime-blocked polyisocyanate and an oxazolidine having at least one substituent of the formula:

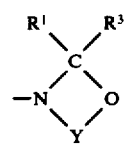

wherein
$R^1$ is a hydrogen atom, a phenyl group, benzyl group, or a $(C_1-C_{12})$ alkyl group, and
$R^2$ is a hydrogen atom or a $(C_1-C_4)$ group, or $R^1$ and $R^2$ are taken together with the attached carbon atom to form a saturated five- or six-membered saturated carbon ring, and
Y is the radical

wherein n is 2 or 3, and
$R^3$ and $R^4$ are, individually, hydrogen atoms, $(C_1-C_{12})$ alkyl groups, $(C_6-C_{10})$ aryl groups, or $(C_7-C_{12})$ aralkyl or alkaryl groups, and heating the composition, in the presence of said water, to a temperature at which the isocyanate is unblocked and said polymeric material is formed.

11. A coating composition according to claim 1 wherein the ketoxime-blocked polyisocyanate is a 2-butanone oxime-blocked isocyanate.

12. A coating composition according to claim 5 wherein the ketoxime-blocked polyisocyanate is 2-butanone oxime-blocked 2-isocyanatoethyl-6-isocyanatocaproate.

13. A coating composition according to claim 1 which also comprises an organosoluble zinc salt.

14. A coating composition according to claim 7 wherein the zinc salt is zinc octoate.

15. The process of claim 10 in which the material is applied to a substrate prior to heating the composition.

16. The process of claim 15 in which the substrate is wood, metal, plastic, paper of leather.

17. A process of claim 16 in which the substrate if plastic, and the temperature is between about 125° F. and 325° F.

18. The process of claim 17 in which the material is heated to a temperature between about 225° and 300° F.

* * * * *